US006970544B1

(12) United States Patent
Reese

(10) Patent No.: US 6,970,544 B1
(45) Date of Patent: Nov. 29, 2005

(54) METHOD AND APPARATUS FOR CALLER ID SYSTEM

(76) Inventor: Morris Reese, P.O. Box 6651, Thousand Oaks, CA (US) 91359-6651

( * ) Notice: Subject to any disclaimer, the term of this patent is extended or adjusted under 35 U.S.C. 154(b) by 0 days.

(21) Appl. No.: 10/889,153

(22) Filed: Jul. 13, 2004

Related U.S. Application Data

(60) Division of application No. 10/160,769, filed on Jun. 3, 2002, now Pat. No. 6,868,150, which is a continuation of application No. 08/614,188, filed on Mar. 13, 1996, now Pat. No. 6,427,009, which is a continuation of application No. 08/093,603, filed on Jul. 19, 1993, now abandoned, which is a continuation of application No. 07/691,492, filed on Apr. 25, 1991, now abandoned, which is a continuation-in-part of application No. 07/460,381, filed on Jan. 3, 1990, now abandoned.

(51) Int. Cl.[7] .......................... H04M 3/42; H04M 1/56; H04M 15/06
(52) U.S. Cl. .............................. 379/201.04; 379/142.04
(58) Field of Search ...................... 379/142.01, 142.04, 379/142.06, 142.17, 207.02, 207.15, 207.16, 379/201.01, 201.04

(56) References Cited

U.S. PATENT DOCUMENTS

| 4,071,699 A | * | 1/1978 | Jovic et al. ............. 379/142.01 |
| 4,332,985 A | | 6/1982 | Samuel ....................... 379/353 |

(Continued)

FOREIGN PATENT DOCUMENTS

GB           2014825 A      8/1979

(Continued)

OTHER PUBLICATIONS

Bellcore Technical Reference TR-TSY-000031, Issue 1, Jun. 1986, "Calling Number Delivery".

(Continued)

*Primary Examiner*—Benny Q. Tieu

(57) ABSTRACT

An apparatus and method are disclosed for accessing telephone or cellular originating central office equipment to control the disclosure of a calling party directory telephone number or, if applicable or available, directory telephone number and name to a called party who subscribes to a Custom Local Area Signaling System (CLASS) service including Caller Identification (Caller ID), which discloses the calling party directory telephone number or directory telephone number and name to the called party, by performing a desired one of a plurality of automatic and/or manual operations. Method is disclosed for connecting to a called station idle or busy telephone line with ringing signals or a call-waiting tone signal and then transmitting the calling party directory telephone number or, if applicable or available, directory telephone number and name to the called station during a silent interval between the ringing signals or after the call-waiting tone signal responsively to receiving the calling party directory telephone number flagged as public from originating central office equipment of the calling party indicating that the directory telephone number or the directory telephone number and name are to be disclosed at the called station. An apparatus and method are also disclosed for receiving, displaying and storing at a called station during a silent interval between ringing signals or after a call-waiting tone signal a calling party directory telephone number or directory telephone number and name from telephone or cellular company terminating central office equipment. In addition, an apparatus and method are disclosed for permitting recall of a stored directory telephone number or directory telephone number and name of a previous caller from memory for visual display, and for permitting automatic dialing of the stored directory telephone number to return a call.

39 Claims, 4 Drawing Sheets

U.S. PATENT DOCUMENTS

| | | | |
|---|---|---|---|
| 4,443,664 A | | 4/1984 | Gange |
| 4,447,676 A | | 5/1984 | Harris et al. ................. 379/199 |
| 4,551,581 A | * | 11/1985 | Doughty ............... 379/142.01 |
| 4,567,323 A | | 1/1986 | Lottes et al. ................ 379/207 |
| 4,582,956 A | * | 4/1986 | Doughty .................. 379/93.14 |
| 4,723,273 A | | 2/1988 | Diesel et al. ............... 379/211 |
| 4,759,056 A | | 7/1988 | Akiyama .................... 379/197 |
| 4,788,720 A | | 11/1988 | Brennan et al. ............ 379/201 |
| 4,796,291 A | * | 1/1989 | Makino ....................... 455/415 |
| 4,873,719 A | * | 10/1989 | Reese ................... 379/215.01 |
| 4,894,861 A | | 1/1990 | Fujioka ....................... 379/374 |
| 4,914,689 A | * | 4/1990 | Quade et al. .......... 379/142.01 |
| 4,922,490 A | | 5/1990 | Blakley .................. 379/142 X |
| 4,924,496 A | * | 5/1990 | Figa et al. ............. 379/142.06 |
| 5,033,076 A | | 7/1991 | Jones et al. .................... 379/67 |
| 5,054,052 A | | 10/1991 | Nonami ........................ 379/57 |
| 5,067,153 A | | 11/1991 | Willie et al. ........... 379/142 X |
| 5,099,507 A | * | 3/1992 | Mukai et al. ................. 340/7.1 |
| 5,121,423 A | | 6/1992 | Morihiro et al. ............ 379/142 |
| 5,155,761 A | | 10/1992 | Hammond .................... 379/67 |
| 5,189,634 A | | 2/1993 | Eberle et al. .......... 364/724.09 |
| 5,228,080 A | | 7/1993 | Nutter et al. ............... 379/373 |
| 5,265,145 A | | 11/1993 | Lim ............................ 379/88 |

FOREIGN PATENT DOCUMENTS

| | | |
|---|---|---|
| JP | 0039154 | 3/1983 |
| JP | 56-13665 | 7/1983 |
| JP | 59/1984-189763 | 10/1984 |
| JP | 0059854 | 4/1985 |
| JP | 62/1987-281647 | 12/1987 |
| JP | 61-213955 | 3/1988 |
| JP | 0070648 | 3/1988 |
| JP | 63-77186 | 4/1989 |
| JP | 0089846 | 4/1989 |
| JP | 0099356 | 4/1989 |
| JP | SHO 64/1989-89846 | 4/1989 |
| JP | 63-76101 | 6/1989 |
| JP | 0248747 | 10/1989 |
| JP | 0251848 | 10/1989 |
| JP | 1253389 | 10/1989 |
| JP | 2256358 | 10/1990 |
| JP | HEI 3/1994-3541 | 1/1991 |

OTHER PUBLICATIONS

Bellcore Technical Advisory TA-NWT-000030, Issue 2, Sep. 1991,"CPE Data Transmitter Requirements".

Bellcore Technical Reference TR-TSY-000030, Issued Nov. 1986,"SPCS Customer Premises Equipment Interface".

Bellcore Technical Reference TR-TSY-000391, Issued Jun. 1988, "Calling Number Delivery Blocking".

German Publication No. 28 06 234, with translation.

German Publication No. 28 52 758, with translation.

German Publication No. 28 52 759, with translation.

German Publication No. 28 52 811, with translation.

Bellcore Technical Reference TA-TSY-000030, Nov. 16, 1984 ("the Bellcore '030 Reference").

"Maestro," by Northern Telecom ("Maestro User Manual").

"Owner's Guide," Bell Atlantic Caller* ID Display Unit Model 64, Revision A, Oct. 1989 ("Bell Atlantic Model 30 Caller*ID Display Unit").

Cidco Adjunct Device Model V1000, see, e.g., Cidco's ICLID/CND CPE Control Program for CIDCO V-1000 Terminal, Mar. 4, 1989.

Cidco Adjunct Device Model SL-40, Aug. 17, 1990 ("CIDCO SL-40").

Cidco Adjunct Device Model SL-64, Aug. 17, 1990 (CIDCO SL-64-2).

"Cidco Caller ID Adjunct Shows Incoming Number on 1st Ring," The Week Home Furnishings Newspaper, Nov. 26, 1990.

Bellcore Technical Reference TR-TSY-000030, "SPCS Customer Premises Equipment Data Interface", Issue 1, Nov. 1988.

NTI phones home with caller ID, Telephony, p. 12, Jan. 15, 1990.

"First caller ID phone for the home," Home Office Computing, vol. 8, No. 3, p. 20 (Apr. 1990).

"Telephone Challenges: a plethora of Services", IEEE Spectrum, Jul. 1990, Tekla S. Perry.

"At Electronics Show, Phones of the Furure," New York Times, Section D, p. 10,col. 5 (Jan. 8, 1990.

* cited by examiner

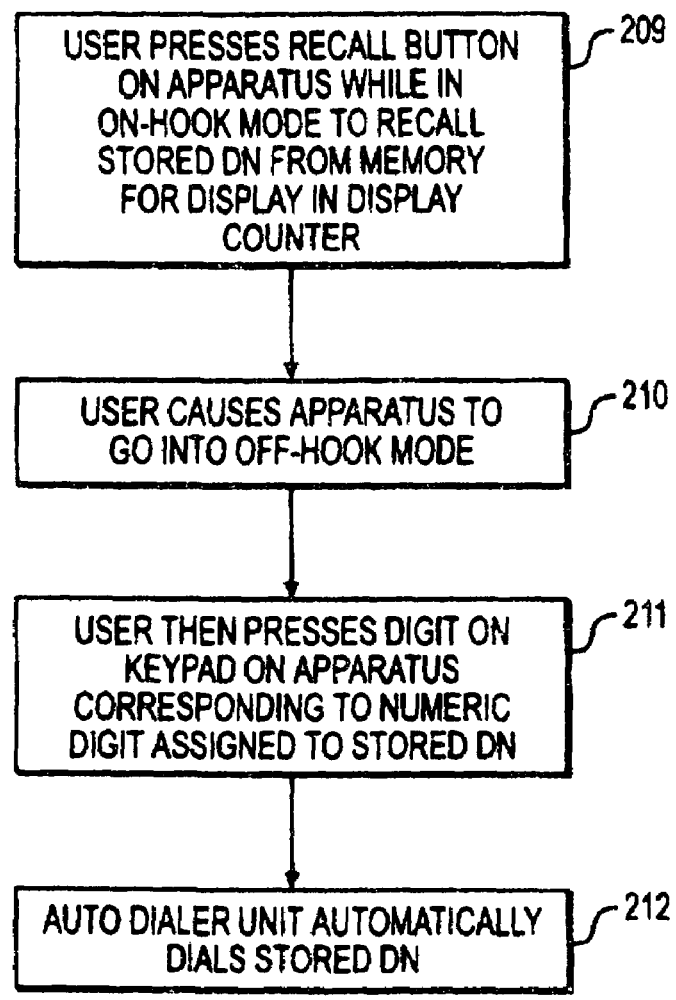

METHOD AND APPARATUS FOR CALLER ID SYSTEM

This is a divisional of application Ser. No. 10/160,769, filed on Jun. 3, 2002 now U.S. Pat. No. 6,868,150 of MORRIS REESE, which is a continuation of application Ser. No. 08/614,188, filed on Mar. 13, 1996 (and issued into U.S. Pat. No. 6,427,009), which is a continuation of application Ser. No. 08/093,603, filed Jul. 19, 1993 (abandoned), which is a continuation of application Ser. No. 07/691,492, filed on Apr. 25, 1991 (abandoned), which is a continuation-in-part of application Ser. No. 07/460,381, filed on Jan. 3, 1990 (abandoned).

BACKGROUND OF THE INVENTION

1. Field of the Invention

This invention relates to an apparatus, such as a pushbutton telephone or other receiving and sending equipment, for use in accessing telephone or cellular company originating central office equipment so as to allow a calling party to control the disclosure of its directory telephone number and/or name (hereinafter sometimes referred to as "directory telephone number with a corresponding name" or "DN") to a called party who subscribes to any of the Custom Local Area Signaling System (CLASS) services such as Caller ID, Automatic Recall, Who Called Me, Automatic Callback and Screening List, to name a few. The apparatus is also for use in receiving a directory telephone number and/or name of a calling third party from telephone or cellular company terminating central office equipment, displaying the received directory telephone number and/or name in a display counter, and storing the received directory telephone number and/or name in memory for later recall by the called party. In addition, the apparatus is for use in permitting the automatic or manual dialing of the stored directory telephone number to return a call. This invention also relates to a method for sending a directory telephone number and/or name of a calling party to a called station during a silent interval between ringing signals or following a call waiting tone signal after receiving at terminating central office equipment serving the called station the calling party's directory telephone number flagged as public from originating central office equipment serving the calling party, indicating that the received directory telephone number or, if applicable, directory telephone number and name of the calling party is to be disclosed at the called station.

2. Description of the Prior Art

Several Regional Bell Operating Companies are offering or planning to offer their customers Caller ID on a subscription basis. This new service discloses the calling party directory telephone number to the called party during the first long interval between ringing signals from a telephone switching office. Due to privacy considerations, most state public utility commissions are requiring their local telephone companies to offer Caller ID along with a blocking service, and for free, so as to allow the calling party to decide on a per call basis whether to disclose or block its directory telephone number to the called party. One blocking service being offered or considered by the Regional Bell Operating Companies require the calling party to dial an access code prior to and as part of the calling sequence in order to override the calling party permanent "public" status of its directory telephone number and temporarily flag the directory telephone number as "private" to indicate to the terminating central office equipment that the directory telephone number is not to be disclosed to the called party. If the access code is dialed as part of the calling sequence, the directory telephone number will be disclosed to the called party. In either case, the originating central office equipment transmits the flagged "public" or "private" directory telephone number to the terminating central office equipment to which the called party telephone line is connected during call setup. If the directory telephone number is flagged "private", the terminating central office equipment connects to the called party telephone line with ringing only. However, if the directory telephone number is flagged "public", the terminating central office equipment connects to the called party telephone line with ringing and the transmission of the calling party's directory telephone number.

The invention disclosed in the Carolyn A. Doughty U.S. Pat. No. 4,582,956, issued Apr. 15, 1986, discloses a method and an apparatus for displaying at a selected station special service information during a silent interval between ringing signals from a telephone switching office. Each received character of the special service information is "temporarily stored" in a data memory of a data receiver by a program-controlled microprocessor and then exhibited in a display unit under the control of the microprocessor. The display is thus initiated during the silent interval and remains until cleared, automatically, when the called party answers the incoming call or when the calling party hangs up. Thus, in either situation, the special service information is retained in memory at the terminating central office switch and not in a memory at the called party apparatus.

SUMMARY OF THE INVENTION

The foregoing problems are solved and a technical advance is achieved by method and apparatus for accessing telephone or cellular company originating central office equipment so as to control the disclosure of a calling party's DN to a called party who subscribes to caller ID or to any of the previously mentioned CLASS services by performing different automatic calling operations. Another technical advance is achieved by method and apparatus for receiving, displaying and storing to memory a calling party's DN sent from telephone or cellular company terminating central office equipment responsively to the calling party's flagged "public" DN received to the terminating central office equipment from originating central office equipment to which the calling party telephone line is connected. A receiver-decoder connected to a called party apparatus (telephone set or separate stand alone unit) receives and decodes signals representing the calling party's DN sent from the terminating central office equipment. A number generator connected to the apparatus generates and assigns a numeric digit(s) to each DN received to the receiver-decoder. An alphanumeric display unit connected to the apparatus displays the received DN in an LED or LCD display counter. A memory unit of the apparatus stores the received DN and the generated digit(s) to memory for later recall and display. Still another technical advance is achieved by method and apparatus for recalling a stored DN from memory for visual display in a display counter, and for automatically or manually dialing the stored DN to return a missed call. For example, assuming that the called party missed the incoming call and decides to return the missed call, the called party presses a recall button on the apparatus to recall the stored DN from memory for display in the LED or LCD display counter. The called party then causes the apparatus to go into an off-hook mode so as to receive dial tone from central office equipment and then presses the digit(s) assigned to the stored DN on a keypad on the apparatus, thus an autodialer unit connected to the apparatus automatically dials the stored DN.

Still yet another technical advance is achieved by method for sending to a called station during a silent interval of a ringing signal cycle or a call-waiting tone signal cycle a calling party's DN from terminating central office equipment responsively to the receipt of the DN from originating central office equipment indicating that the DN is to be disclosed at the called station. For example, the terminating central office equipment responds to the receipt of the calling party's "public" DN from the originating central office equipment by connecting to a voice channel of the called party busy or idle telephone line with a ringing signal or a call-waiting tone signal and then sending the DN to an apparatus at the called station during a silent interval of the ringing signal cycle or the call-waiting tone signal cycle.

In accordance with the teaching of this invention I provide a calling party with a programmable apparatus and methods of accessing telephone or cellular company originating central office equipment so as to control the disclosure of the calling party DN to a called party who subscribes to Caller ID or to any of the other CLASS services by performing different automatic calling operations. I also provide the called party with the programmable apparatus for use in receiving, displaying and storing to memory the calling party's DN sent from telephone or cellular company terminating central office equipment.

In one operation of this invention, i.e. in FIG. 1, the calling party programs the apparatus prior to going off-hook to perform a desired automatic calling operation by pressing either a display button or a block button on the apparatus, in addition to pressing a desired digit on the apparatus keypad corresponding to a stored phone number of a person to be contacted. The desired automatic calling operation begins when the calling party causes the apparatus to go into an off-hook mode. The telephone or cellular company originating central office equipment to which the calling party telephone line is connected detects the off-hook condition on the telephone line and sends dial tone. A dial tone detector of the apparatus detects the dial tone while a microprocessor of the apparatus responsive to the detection of the dial tone determines whether the display button or the block button has been activated. If neither the display button nor the block button has been activated, conventional automatic or manual dialing of the stored phone number or any other phone number prevails. Assuming that the display button and the digit corresponding to the stored phone number of the person to be contacted have, indeed, been activated, an autodialer with memory unit of the apparatus automatically dials the stored phone number. The originating central office equipment responds to the autodialed phone number by temporarily flagging the calling party permanent stored DN as "public" and automatically transmitting the flagged "public" DN to the terminating central office equipment to which the called party telephone line is connected. The terminating central office equipment responds to the receipt of the flagged "public" DN from the originating central office equipment by connecting to the called party busy or idle telephone line with ringing signals or a call-waiting tone signal and transmitting the DN to the called party apparatus during a silent interval between the ringing signals or after the call-waiting tone signal. The apparatus receives the DN, generates and assigns a numeric digit to the received DN, displays the received DN in an LED or LCD display counter and stores the received DN to memory so as to allow the called party to later recall the stored DN from the memory for display and automatic or manual dialing of the stored DN to return a missed call.

In another operation of this invention, if it is determined that the block button has been activated, the autodialer with memory unit of the apparatus automatically dials a prestored access code. The access code instructs the originating central office equipment, to which the calling party is connected, to temporarily flag the calling party permanent stored DN as "private". In continuance, the microprocessor of the apparatus immediately makes a decision to determine whether the digit corresponding to the stored phone number of the person to be contacted has been activated. Assuming that the digit has been activated, the autodialer with memory unit, which is now in a pause mode, automatically dials the stored phone number. The originating central office equipment responds to the receipt of the autodialed phone number by temporarily flagging the calling party permanent stored DN as "private" and automatically transmitting the flagged "private" DN to the terminating central office equipment to which the called party telephone line is connected. The terminating central office equipment responds to the receipt of the flagged "private" DN from the originating central office equipment by connecting to the called party idle telephone line and transmitting ringing signals only, or by connecting to the called party busy telephone line and transmitting a call-waiting tone signal only.

In still another operation of this invention, if it is determined that neither the display button nor the block button has been activated, conventional automatic or manual dialing of any access code and/or phone number prevails.

In still yet another operation of this invention, if it is determined that the display button has been activated and the digit corresponding to the stored phone number of the person to be contacted has not been activated, the calling party automatically or manually dials the stored phone number or any other desired phone number of the person to be contacted.

BRIEF DESCRIPTION OF THE DRAWINGS

The invention may be better understood from the following description when read together with the drawing, in which:

FIG. 2B shows, in flow chart form, method for automatically dialing a stored DN of a previous caller previously sent from terminating central office equipment responsively to the receipt of the DN flagged as public from originating central office equipment.

DESCRIPTION OF THE PREFERRED EMBODIMENT(S)

Figure 1:
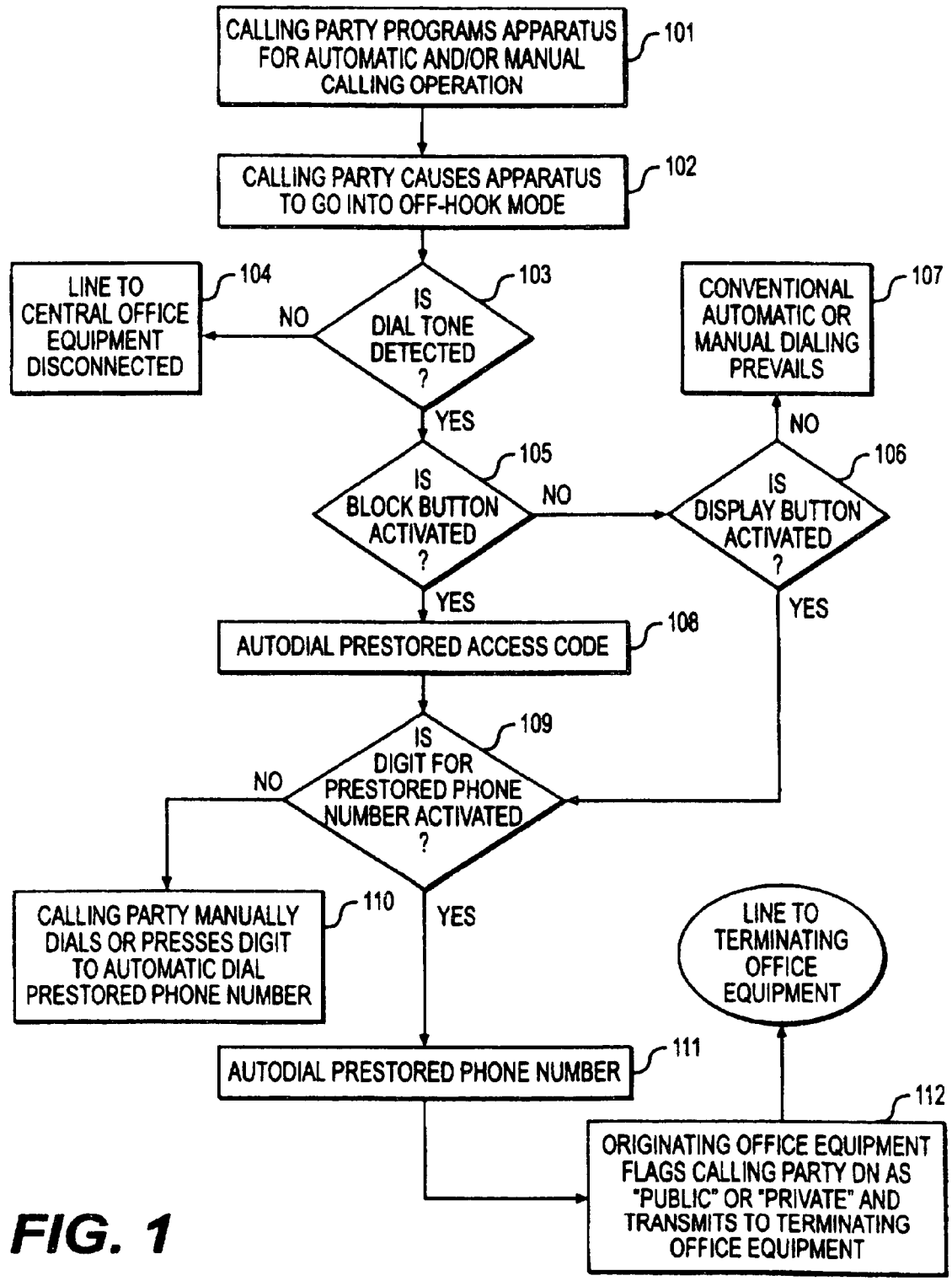
FIG. 1 shows, in flow chart form, method and apparatus for accessing originating central office equipment to control the disclosure of a calling party's DN to a called party who subscribes to Caller ID service or to any other CLASS service by performing different automatic or manual calling operations.

A first operation of the invention is illustrated in the flow chart of FIG. 1, which shows a calling party (step 101) programming its apparatus while in an on-hook mode to perform a desired automatic and/or manual calling operation by pressing either the block button or the display button on the apparatus plus a digit on the apparatus keypad corresponding to a prestored phone number of the person or entity to be contacted. The calling party (step 102) then causes the apparatus to go into an off-hook mode by either pressing a predetermined button on the apparatus or by lifting the handset on the apparatus. The originating central office equipment, prior art, responds to the off-hook condition on the calling party telephone line by sending dial tone. The dial tone detector (step 103), which is connected to the apparatus, detects the dial tone and signals the microprocessor (steps 105 and 106) which, in turn, determines whether the block button or the display button has been activated by the calling party (step 101). However, if the dial tone is not detected by the dial tone detector (step 103), it is presumed that the calling party apparatus is not connected via telephone lines to the originating central office equipment.

Assuming that the microprocessor (steps 105 and 106) determines that the block button has, indeed, been activated, the autodialer with memory unit (step 108), which is connected to the apparatus, automatically dials a prestored access code which instructs the originating central office equipment to temporarily flag the calling party permanent stored "public" DN as "private". The microprocessor (step 109) makes another decision, while the autodialer with memory unit (step 108) is in a pause mode, to determine whether the digit corresponding to the prestored phone number of the person or entity to be contacted has been activated. If it is determined that the digit has been activated, the autodialer with memory unit (step 111) is signaled to start dialing the prestored phone number. The originating central office equipment (step 112), prior art, responds to the receipt of the autodialed phone number by flagging the calling party permanent stored "public" DN as "private" and transmitting the flagged "private"DN to the terminating central office equipment to which the called party telephone line is connected.

Referring now back to the microprocessor (steps 106 and 109), if it is determined that the display button and the digit corresponding to the prestored phone number have been activated, step 111 is the same as previously described. The originating central office equipment (step 112), prior art, responds to the receipt of the autodialed phone number by flagging the calling party permanent stored DN as "public" and transmitting the flagged "public" DN to the terminating central office equipment to which the called party telephone line is connected.

Referring now back to the microprocessor (steps 105 and 106), if it is determined that neither the block button nor the display button has been activated, the calling party (step 107) is permitted to conventionally dial, either automatically and/or manually, any access code and/or phone number of choice.

Referring now back to the microprocessor (steps 105, 106 and 109), if it is determined that the display button has been activated but the digit corresponding to the prestored phone number has not been activated, the calling party (step 110) is permitted to conventionally dial, either automatically or manually, the prestored phone number or any other phone number of choice.

Figure 2:
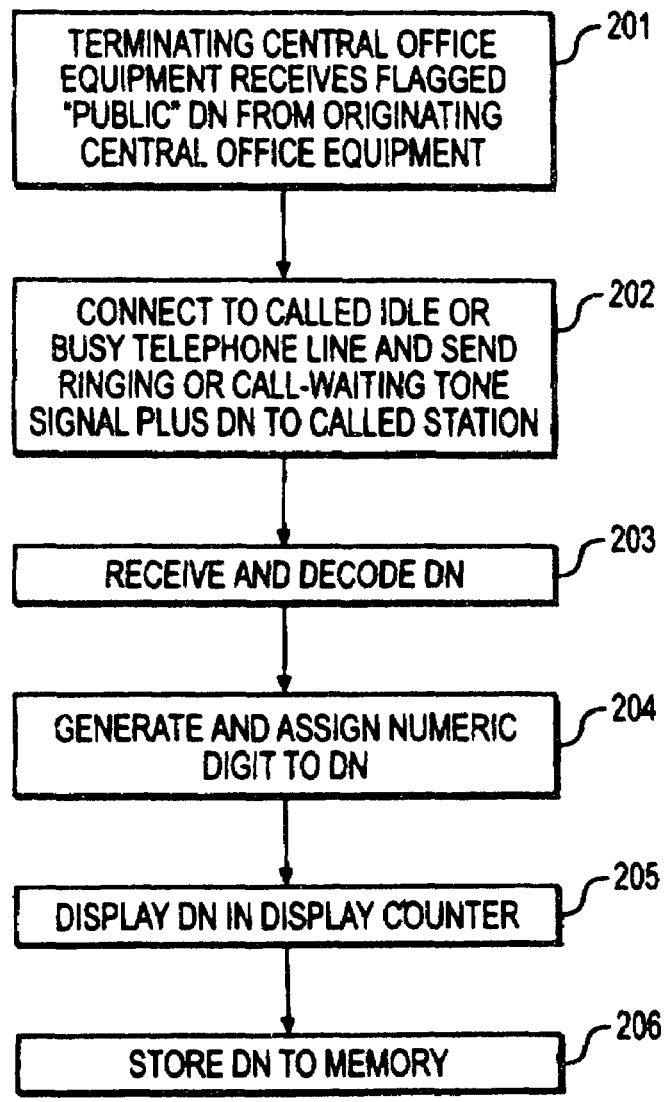
FIG. 2 shows, in flow chart form, method for sending via a voice channel of a busy or an idle telephone line to an apparatus at a called station a DN of a calling party from terminating central office equipment, and the apparatus receiving the DN, generating and assigning a numeric digit to the received DN, displaying the received DN in a display counter, and storing the received DN to memory.

In FIG. 2, the terminating central office equipment (step 201) to which a called party telephone line is connected receives a calling party flagged "public" DN from originating central office equipment to which the calling party telephone line is connected.

The terminating central office equipment (step 202) responds to the receipt of a calling party flagged "public" DN from originating central office equipment to which the calling party telephone line is connected by connecting to a voice channel of a called party busy telephone line with a call-waiting tone signal and sending the calling party DN to an apparatus at the called station during a silent interval after the call-waiting tone signal, or by connecting to a voice channel of a called party idle telephone line with ringing signals and sending the calling party DN to an apparatus at the called station during a silent interval between the ringing signals.

A receiver-decoder (step 203), connected to the called party apparatus (telephone set or separate stand alone unit), receives and decodes signals representing the calling party DN sent from the terminating central office equipment (step 202). A number generator (step 204), connected to the apparatus, generates and assigns a numeric digit or digits to each DN received to the receiver-decoder (step 203). An alphanumeric display unit (step 205), connected to the apparatus, displays the DN and its assigned numeric digit or digits in an LED or LCD display counter. A memory unit (step 206), connected to the apparatus, stores the DN and its assigned digit or digits to memory for later recall and display.

Figure 2A:
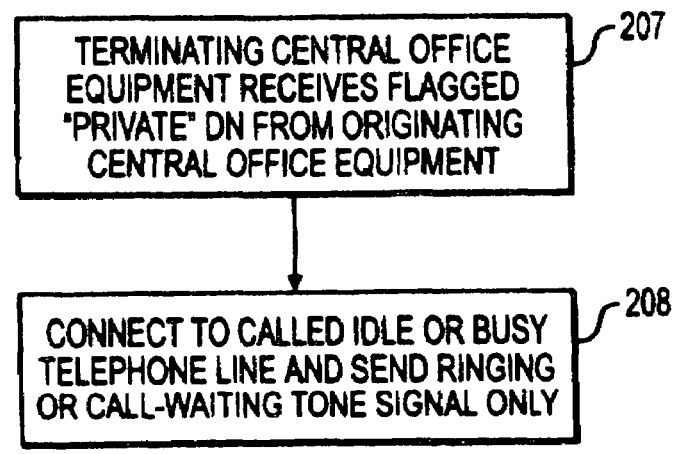
FIG. 2A shows, in flow chart form, method for sending via a voice channel of a busy or an idle telephone line to a called station ringing signals only or a call-waiting tone signal only from terminating central office equipment responsively to receiving a flagged "private" DN from originating central office equipment.

In FIG. 2A, the terminating central office equipment (step 207) to which a called party telephone line is connected receives a calling party flagged "private" DN from originating central office equipment to which the calling party telephone line is connected. The terminating central office equipment (step 208) responds to the receipt of the flagged "private" DN from the originating central office equipment by connecting to a voice channel of the called party busy telephone line with a call-waiting tone signal only, or by connecting to a voice channel of the called party idle telephone line with ringing signals only.

In FIG. 2B, assuming that the called party missed the incoming call from the calling party and decides to return the missed call, the called party presses a recall button (step 209) on the apparatus to recall the stored DN from the memory unit (step 206 of FIG. 2) for display in the LED or LCD display counter (step 205 of FIG. 2). The called party (step 210) then causes the apparatus to go into an off-hook mode so as to receive dial tone from the originating central office equipment 301 of FIG. 3 and then presses the digit or digits assigned to the stored DN on a keypad (step 211) on the apparatus. An autodialer unit (step 212) of the apparatus responds to the digit or digits pressed on the keypad by automatically dialing the stored DN.

Figure 3:
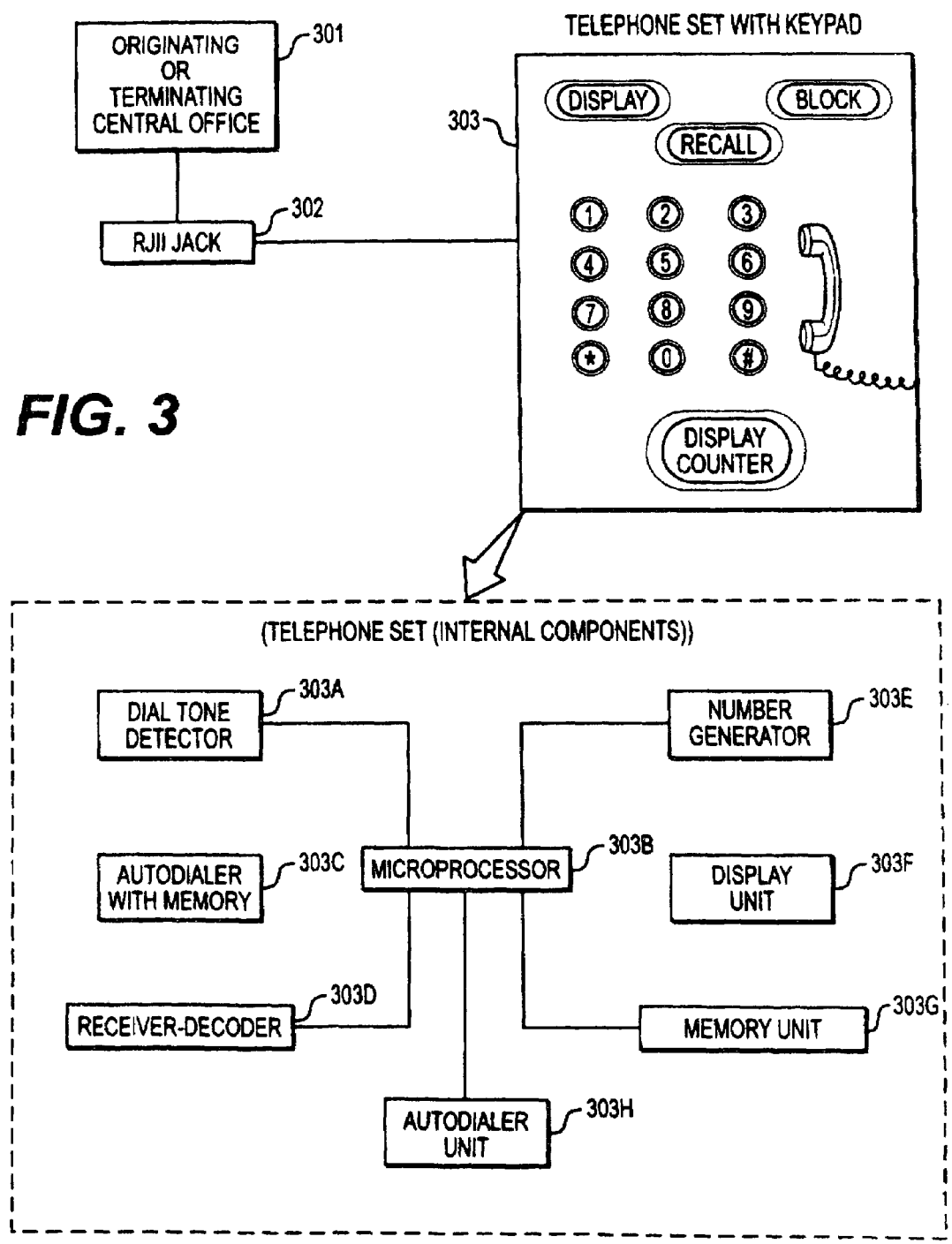
FIG. 3 shows a simplified diagram of the principal components of an apparatus (telephone set or other receiving and sending devices) connected via telephone lines and a RJ11 jack to originating or terminating central office equipment for performing the various operations of the inventions.

In FIG. 3, is shown a simple block diagram configuration of the principal components (303A, 303B, 303C, 303D, 303E, 303F, 303G and 303H) of an apparatus 303 (telephone set or separate stand alone unit 303) connected via telephone lines and a RJ11 jack 302 to originating or terminating central office equipment 301.

Dial tone detector 303A is for detecting dial tone sent from originating central office equipment 301 responsively to an off-hook condition detected on the telephone line of apparatus 303.

Autodialer with memory unit 303C is for automatically dialing a prestored access code and/or a stored phone number.

Receiver-decoder 303D is for receiving and decoding signals representing a calling party's DN sent from terminating central office equipment 301 during a silent interval between ringing signals or following a call-waiting tone signal.

Number generator 303E is for generating and assigning a numeric digit(s) to each DN received via receiver-decoder 303D.

Display unit 303F is for displaying in an LED or LCD display counter on apparatus 303 the DN received from terminating central office equipment 301 via receiver-decoder 303D, and for displaying in the LED or LCD display counter a stored DN when recalled from memory unit 303G.

Memory unit 303G is for storing to memory for later recall, display and automatic or manual dialing of the DN received from terminating central office equipment 301 via receiver-decoder 303D.

Autodialer unit 303H is for automatically dialing the stored DN in memory unit 303G.

Recall button on apparatus 303 is for initiating the recall of the stored DN from memory unit 303G for visual display in the LED or LCD display counter on apparatus 303.

Display button, block button and keypad on apparatus 303 are for enabling programming of the apparatus 303 on a per call basis to perform a desired automatic and/or manual calling operation.

Microprocessor 303B is for interacting with and controlling the above functions or functional devices by any known technique.

Originating central office equipment 301 is responsive to the receipt of an autodialed phone number of a person to be contacted for temporarily flagging a DN of a calling party "public" or "private" and then sending the flagged "public" or "private" DN to terminating central office equipment to which the person to be contacted telephone line is connected in the manner conventional for the Caller ID process. The originating central office equipment 301 is also for sending dial tone to a telephone station of a calling party in response to an off-hook condition detected on a telephone line of the telephone station.

Terminating central office equipment 301 is responsive to the receipt of a flagged "public" DN from originating central office equipment for connecting to a voice channel of a busy telephone line of a telephone station with a call-waiting tone signal and then transmitting the DN to an apparatus 303 at the telephone station during a silent interval after the call-waiting tone signal, or for connecting to a voice channel of an idle telephone line of the telephone station with ringing signals and then transmitting the DN to an apparatus 303 at the telephone station during a silent interval between the ringing signals. Terminating central office equipment 301 is also responsive to the receipt of a flagged "private" DN from originating central office equipment for connecting to a voice channel of a busy telephone line of a telephone station with a call-waiting tone signal only, or for connecting to a voice channel of an idle telephone line of a telephone station with ringing signals only.

While the present invention has been described in connection with preferred embodiment (s) thereof, it is to be understood that additional embodiment (s), modifications and applications that will become obvious to those skilled in the art are included within the spirit and scope of the invention.

What is claimed is:

1. A method for receiving at a telephone station a directory phone number (DN) of a calling party during a silent interval between ringing signals from a telephone or a cellular company terminating central office (TCO), said TCO sending said DN of the calling party to said called station during the silent interval between said ringing signals, said method comprising the steps of:
   (a) receiving at said telephone station said DN of the calling party from said TCO during the silent interval and displaying said received DN in a display;
   (b) producing an identifier and associating the identifier to said received DN; and
   (c) storing said received DN in memory for later recall, visual display and or redialing.

2. A method as forth in claim 1, wherein said method further comprises the step of recalling the calling party stored DN from said memory and displaying said recalled DN and its associated identifier in a display if a recall button is pressed at said telephone station.

3. A method as set forth in claim 1, wherein the calling party's DN identifies a cellular mobile telephone.

4. A method as set forth in claim 1, wherein step (a) comprises the step of receiving a corresponding name along with said DN and displaying said received name with said DN in the display.

5. A method as set forth in claim 1, wherein the identifier comprises a numeric digit(s) or number that identifies and distinguishes or sets apart said received DN of the calling party from other received DNs.

6. A method as set forth in claim 1, wherein said TCO is telephone or cellular company switching office equipment.

7. A method as set forth in claim 1, wherein said telephone station is a cellular mobile phone.

8. A method as set forth in claim 1, wherein said telephone station is a pushbutton telephone or other receiving and sending equipment.

9. Apparatus for receiving and displaying at a called station having a Custom Local Area Signaling System (CLASS) service including Caller Identification (Caller ID) a directory phone number (DN) of a calling party from a telephone or a cellular company terminating central office (TCO), said TCO sending ringing signals toward the called station, said apparatus comprising:
   (a) means for receiving at said called station having said CLASS service including said Caller ID said DN of the calling party from said TCO during a silent interval between said ringing signals and displaying said received DN in a display;
   (b) means for creating an identifier and associating the identifier to said received DN; and
   (c) means for storing said received DN in memory for later recall display and redialing.

10. The apparatus in accordance with claim 9, in which said apparatus further comprising:
   (d) means for recalling the calling party stored DN from said memory and displaying said recalled DN and its associated identifier in a display on said apparatus if a user presses a recall button on said apparatus;
   (e) means for responding to initiation of an off-hook condition at the called station to receive dial tone from a telephone or a cellular company originating central office if the user causes said apparatus to go into an off-hook mode;

(f) means for responding to the user pressing on said apparatus keypad said identifier associated to said displayed DN to initiate an automatic calling operation if the off-hook condition has occurred at the called station; and (g) The automatic calling operation including automatically dialing said displayed DN.

11. A method for sending to a called station having a Custom Local Area Signaling System (CLASS) service including Caller Identification (Caller ID) a directory telephone number (DN) of a calling party, ping the steps of:

(a) receiving at a telephone or a cellular company terminating central office (TCO) serving said called station having said CLASS service including said Caller ID the calling party DN flagged as public from an originating central office of the calling party, indicating that said DN is to be disclosed at said called station;

(b) said TCO sending intermittent signals to said called station; and (c) said TCO then transmitting said DN of the calling party to said called station during a silent interval between said ringing signals.

12. A method as set forth in claim 11, further comprising the steps of:

(d) receiving by an apparatus at said called station said DN of the calling party from said TCO during the silent interval and displaying said received DN in a display;

(e) generating and assigning a number to said received DN; and (f) storing said received DN in memory for later recall, visual display and or redialing.

13. A method as set forth in claim 11, wherein step (c) comprises the step of transmitting a corresponding name along with said DN.

14. A method as set forth in claim 12, wherein step (d) comprises the step of receiving a corresponding name along with said DN and displaying said received name and said DN in the display.

15. A method as set forth in claim 12, wherein said method further comprises the step of recalling said stored DN of the calling party from said memory and displaying said recalled DN along with its assigned number in the display if a recall button is pressed on the apparatus.

16. A method as set forth in claim 12, wherein the number identifies and distinguishes or sets apart said received DN of the calling party from other received DNs.

17. A method as set forth in claim 12, wherein the apparatus is a cellular mobile telephone.

18. A method as set forth in claim 12, wherein the apparatus is a pushbutton telephone or other receiving and sending equipment.

19. A method for transmitting to an idle called station a directory number (DN) of a calling party, comprising the steps of:

(a) receiving at a telephone or a cellular company local switching office (LSO) said called station having a Custom Local Area Signaling System (CLASS) service including Caller Identification (Caller ID) the calling party DN flagged as public from an originating central office of the calling party, indicating that said DN is to be disclosed at said called station;

(b) said LSO sending intermittent ringing signals to said called station having said CLASS service including said Caller ID;

(c) said LSO transmitting the calling party DN to said called station having said CLASS service including said Caller ID during a silent interval between said ringing signals;

(d) receiving by an apparatus at said called station the calling party DN from said LSO during the silent interval and displaying said received DN in a display;

(e) generating a number and assigning the number to said received DN; and (f) storing said received DN in memory for later recall, display and or redialing.

20. A method as set forth in claim 19, wherein step (c) comprises the step of transmitting a corresponding name along with said DN of the calling party.

21. A method as set forth in claim 19, wherein step (d) comprises the step of receiving a corresponding name along with said DN of the calling party and displaying said received name and said DN in the display.

22. A method as set forth in claim 19, wherein said method further comprises the step of recalling said stored DN of the calling party from said memory and displaying said recalled DN along with its assigned number in the display if an user presses a recall button on the apparatus.

23. A method as set forth in claim 19, wherein the apparatus is a cellular mobile telephone.

24. A method as set forth in claim 19, wherein the apparatus is a pushbutton telephone or other receiving and sending equipment.

25. A method for sending to a called station during a silent interval between ringing signals a telephone number (DN) of a calling party from a terminating central office (TCO) after receiving the calling party DN flagged as public from an originating central office of the calling party, indicating that said DN is to be disclosed at the called station, said TCO sending said ringing signals to the called station, comprising the steps of:

(a) said TCO transmitting said DN of the calling party to the called station during the silent interval between said signals after receiving said DN flagged as public from the originating central office of the calling party;

(b) receiving by an apparatus at the called station during the silent interval said DN from said TCO and displaying said received DN in a display on the apparatus;

(c) producing a number and associating the number to said received DN; and (d) storing said received DN in memory for later recall, visual display and or redialing.

26. A method as set fort in claim 25, wherein step (a) comprises the step of transmitting a corresponding name along with said DN of the calling party.

27. A method as set forth in claim 25, wherein step (b) comprises the step of receiving a corresponding name along with said DN of the calling party.

28. A method as set fort in claim 25, wherein said method further comprises the step of recalling the calling party stored DN from said memory and displaying said recalled DN along with its associated number in a display on the apparatus after a recall button is pressed on the apparatus.

29. A method as set forth in claim 25, wherein said TCO is telephone or cellular company switching office equipment.

30. A method as set forth in claim 25, wherein said associated number identifies and distinguishes or sets apart said received DN of the calling party from other received DNs.

31. A method as set forth in claim 25, wherein said apparatus is a cellular mobile telephone.

32. A method as set forth in claim 25, wherein said apparatus is a pushbutton telephone or other receiving and sending equipment.

33. A method for connecting to a called station idle telephone line with intermittent ringing signals from a terminating central office (TCO) and transmitting a calling party directory telephone number (DN) to the called station during a silent interval between said ringing signals after receiving the calling party DN flagged as public from an originating central office (OCO) of the calling party, comprising the steps of:
- (a) said TCO connecting to the called station idle telephone line with said ringing signals;
- (b) said TCO then transmitting the calling party DN to the called station during the silent interval between said ringing signals after receiving the calling party DN flagged as public from said OCO of the calling party indicating that said DN is to be disclosed at the called station;
- (c) receiving by an apparatus at the called station during the silent interval the calling party DN from said TCO and displaying said received DN in a display on the apparatus;
- (d) creating a number and associating said created number to said received DN of the calling party; and
- (e) storing said received DN of the calling party in memory for later recall, visual display and or redialing.

34. A method as set forth in claim 33, wherein said method further comprises the step of recalling said stored DN of the calling party from said memory and displaying said recalled DN along with its associated number in the display on the apparatus after a user presses a recall button on the apparatus.

35. A method as set forth in claim 33, wherein step (b) comprises the step of transmitting a name along with the calling party DN.

36. A method as set forth in claim 33, wherein step (c) comprises the step of receiving a name along with the calling party DN.

37. A method as set forth in claim 33, wherein said created number identifies and distinguishes or sets apart said received DN of the calling party from other received DNs.

38. A method as set forth in claim 33, wherein the apparatus is a telephone or other receiving and sending equipment.

39. A method for connecting a called station idle telephone line with intermittent ringing signals from a terminating central office (TCO) serving the called station and transmitting a calling party directory phone number (DN) to the called station during a silent interval between said ringing signals after receiving the calling party DN flagged as public from an originating central office (OCO) of the calling party, comprising the steps of:
- (a) said TCO connecting the called station idle telephone line with said ringing signals;
- (b) said TCO then transmitting the calling party DN to the called station during the silent interval between said ringing signals after receiving the calling party DN flagged as public from said OCO of the calling party indicating that said DN is to be disclosed at the called station; and
- (c) receiving by an apparatus at the called station during the silent interval the calling party DN from said TCO and displaying said received DN in a display on the apparatus.

* * * * *